July 13, 1926. 1,592,105
T. L. HARRIS ET AL
AUTOMOBILE CLUTCH
Filed June 4, 1925
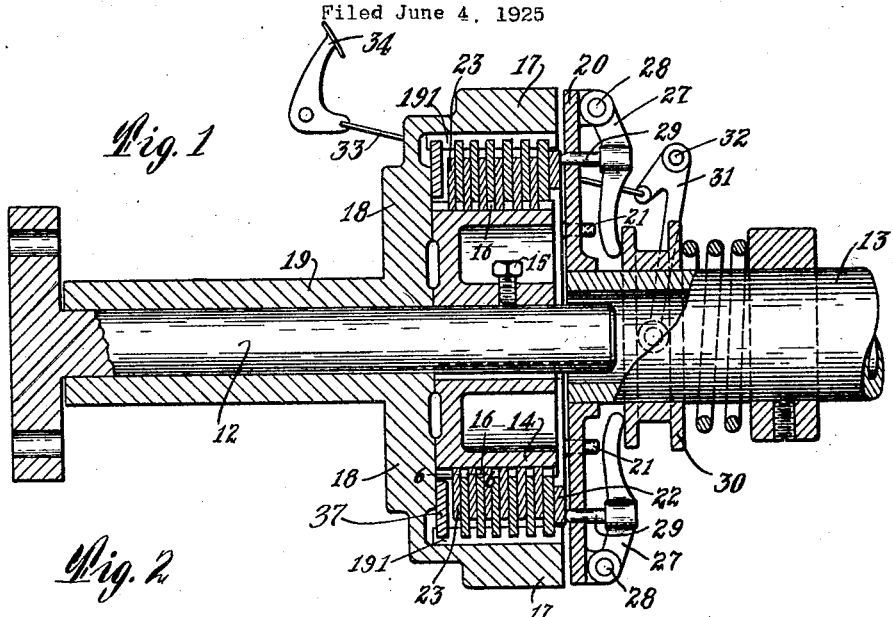
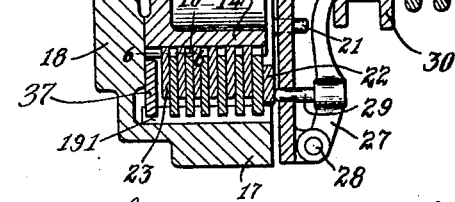
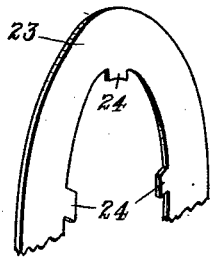
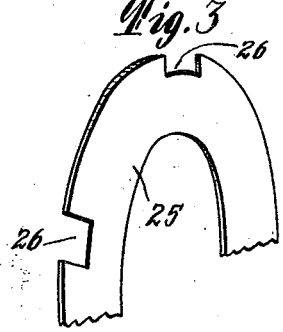
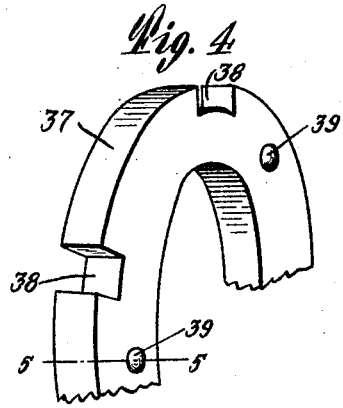
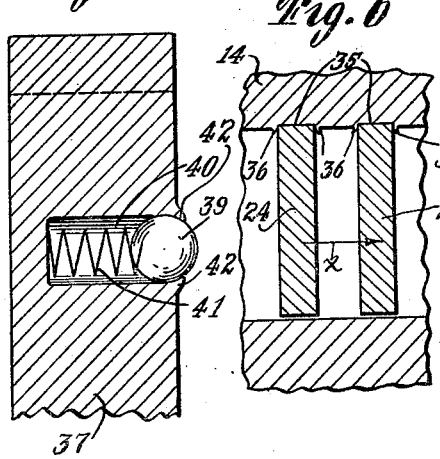
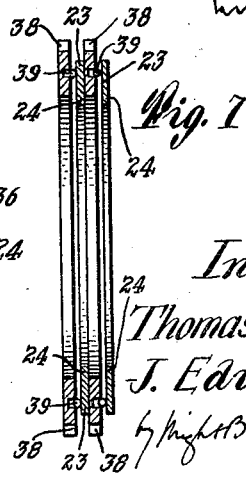
Inventors:
Thomas L. Harris,
J. Edwin Beyea,
attys.

Patented July 13, 1926.

1,592,105

UNITED STATES PATENT OFFICE.

THOMAS LEON HARRIS, OF READING, AND JOHN EDWIN BEYEA, OF WAKEFIELD, MASSACHUSETTS.

AUTOMOBILE CLUTCH.

Application filed June 4, 1925. Serial No. 35,010.

This invention relates to a clutch comprising a grooved inner drum, an internally ribbed outer drum having an abutment and a group of annular clutch disks including a series of disks having external slots engaged with the ribs of the outer drum, and a series of disks alternating with the slotted disks and having tongues engaged with the grooves of the inner drum.

The chief object of the invention is to enable one or more of the externally slotted disks engaging the ribs of the outer drum, to be utilized in preventing liability of failure of the clutch to release when binding pressure is removed from the disks.

This object is attained by the improvement hereinafter described.

Of the accompanying drawing forming a part of this specification,—

Figure 1 shows in longitudinal section a clutch of the Ford type, provided with a pressing clutch disk in accordance with our invention.

Figure 2 is a fragmentary perspective view, showing a portion of one of the internally tongued clutch disks.

Figure 3 is a fragmentary perspective view, showing a portion of one of the externally slotted clutch disks.

Figure 4 is a fragmentary perspective view, showing a portion of the pressing clutch disk characterizing our invention.

Figure 5 is a section on line 5—5 of Figure 4.

Figure 6 is an enlarged fragmentary section on line 6—6 of Figure 1.

Figure 7 shows in section two externally slotted pressing disks alternating with two internally tongued disks.

The same reference characters indicate the same parts in all of the figures.

The drawings show a clutch of the well known Ford type, characterized by our improvement, as hereinafter described. 12 designates a driving shaft, and 13 a driven shaft alined with the driving shaft. 14 designates the usual clutch disk or inner drum, fixed by a set screw 15 to the driving shaft, and provided with the usual longitudinal grooves 16 in its periphery. 17 designates the usual outer drum connected by a disk abutment 18 with a hub or sleeve 19, supported by the driving shaft.

The internal face of the outer drum 17 is provided with the usual inwardly projecting guide ribs 191, extending parallel with the grooves 16. To the driven shaft 13 is fixed the annular driving plate 20, having orifices in which are slidable the pins 21, fixed to the push ring 22. The push ring, its pins, and the driving plate transmit torque from the driving to the driven shaft, when the usual annular clutch disks, next described, are in operative frictional contact with each other, and the end disks are in operative contact with the abutment 18 and the push ring 22.

The clutch disks are thin flat-sided annuli, arranged side by side in a group which includes a series of disks 23 (Figure 2) having tongues 24 on their inner margins, entering and slidable in the grooves 16 in the inner drum 14, and a series of larger disks 25 (Figure 3) alternating with the disks 23 and having slots 26 in their outer margins, receiving and slidable on the ribs 191, on the outer drum 17.

The usual pressing mechanism employed to press the disks together, includes levers 27, pivoted at 28 to the driving plate 20, and provided with push studs 29, movable in orifices in the driving plate, and bearing on the push ring 22, a collar 30, slidable on the driven shaft 13, and means for forcibly moving the collar on the driven shaft to cause the studs to exert pressure on the push ring, said means including a bell-crank lever 31, fulcrumed at 32, one arm of the lever engaging the collar 30, and the other arm being connected by a rod 33 with a clutch pedal 34.

The operation of a clutch organized as above described, is so well known that further description thereof is unnecessary. Heretofore the clutch disk at one end of the group in contact with the abutment 18 of the outer drum, has been one of the disks 25, and has acted only as a clutch disk. When the clutch is rendered operative by the binding pressure of the pressing mechanism on the disks, the contact of the tongues 24 of the disks 23 with the sides of the inner drum grooves 16, against which the thin edges of the tongues are pressed, is liable to wear slight indentations 35 in the sides of the grooves, as shown by Figure 6, which is a much enlarged section on line 6—6 of Figure 1. A result of these indentations is the formation of minute burrs 36, projecting from the sides of the grooves and bearing on the sides of the tongues. These burrs are sometimes sufficient to prevent the separation of the disks from each other, and the release of the clutch when the binding pressure on the disks ceases. The chief object of our invention is to overcome this objection. In attaining this object, we remove, preferably, two of the ordinary disks at the end of the group, adjacent to the abutment 18, and substitute for the removed disks a thicker disk 37, which we call a pressing disk, or separator, bearing on the abutment 18, and provided with slots 38 in its outer margin, adapted to receive the guide ribs 191 of the outer drum 17.

The pressing disk 37 performs the usual function of a disk 25, and is provided with resilient pressing means including balls 39, movable in sockets 40 in the pressing disk, and normally projected from the inner face thereof by springs 41. The projection of the balls 39 is limited by stops 42, formed by contracting the outer ends of the sockets, as shown by Figure 5. The balls are forced by the springs against the adjacent disk 23, and the aggregate strength of the springs is sufficient to move all the disks 23 and 25 away from the abutment 18, and in the direction of the arrow $x$ in Figure 6, when the disks are released by the pressing mechanism, and cause the tongues 24 to move across the burrs 36 at one side of the tongues, so that the burrs do not prevent the release of the clutch. The movement of the tongues in the opposite direction, when binding pressure is exerted by the pressing mechanism, causes the tongues to move across the burrs at the opposite sides of the tongues.

All liability of preventing the release of the clutch by burrs formed as described, is thus prevented.

If desired, more than one pressing disk 37 may be employed, as indicated by Figure 7, the pressing disks alternating with the disks 23.

It will be seen that the pressing disk or disks may be installed in a clutch of the type shown, without any change in the construction of the clutch, other than the substitution of a pressing disk or disks for one or more of the usual disks 25.

Failure of the clutch disks to separate when the binding pressure is removed, is caused not alone by the indentations and burrs above described, but also by the fact that adhesion of the clutch disks to each other is caused by the oil used to lubricate the disks, the adhesion being particularly pronounced in cold weather, when the oil becomes thick and viscous. Such adhesion between the pressing disk and the adjacent disk 23, shown by Figure 1, is prevented by the expanding action of the pressing disk, which may be called an expander. When more than one of these expanders is employed, as shown by Figure 7, the trouble caused by adhesion is further reduced.

We claim:

1. A clutch comprising a grooved inner drum having external grooves; an internally ribbed outer drum having internal guide ribs and an abutment; a group of annular clutch disks including a series of externally slotted disks engaged with the ribs of the outer drum, and a series of internally tongued disks, alternating with the slotted disks and engaged with the grooves of the inner drum; and pressing mechanism adapted to bind and release the disks, the externally slotted disks including a pressing disk bearing on said abutment, and having resilient means adapted to force the other disks away from the abutment, for the purpose specified.

2. A clutch comprising a grooved inner drum having external grooves; an internally ribbed outer drum having internal guide ribs and an abutment; a group of annular clutch disks including a series of externally slotted disks engaged with the ribs of the outer drum, and a series of internally tongued disks, alternating with the slotted disks and engaged with the grooves of the inner drum; and pressing mechanism adapted to bind and release the disks, one of the externally slotted disks bearing on said abutment and provided with sockets and with balls and springs in said sockets, adapted to normally project the balls and force the other disks away from the abutment, for the purpose specified.

In testimony whereof we have affixed our signatures.

THOMAS LEON HARRIS.
JOHN EDWIN BEYEA.